(12) United States Patent
Marcinkiewicz et al.

(10) Patent No.: US 9,009,210 B2
(45) Date of Patent: Apr. 14, 2015

(54) DISTRIBUTION OF MULTIMEDIA FILES USING A TRANSPORTATION PROVIDER WIRELESS DEVICE

(75) Inventors: Walter M. Marcinkiewicz, Chapel Hill, NC (US); Gary R. Cole, Cary, NC (US); Toby John Bowen, Durham, NC (US); Yojak Harshad Vasa, Cary, NC (US); Mats Pettersson, Sövde (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 2069 days.

(21) Appl. No.: 11/860,767

(22) Filed: Sep. 25, 2007

(65) Prior Publication Data

US 2009/0049119 A1   Feb. 19, 2009

Related U.S. Application Data

(60) Provisional application No. 60/956,036, filed on Aug. 15, 2007.

(51) Int. Cl.
| | |
|---|---|
| *G06F 15/16* | (2006.01) |
| *G08B 3/00* | (2006.01) |
| *H04L 29/08* | (2006.01) |
| *H04L 29/06* | (2006.01) |
| *H04W 4/00* | (2009.01) |
| *H04W 88/18* | (2009.01) |

(52) U.S. Cl.
CPC ............... *H04L 67/06* (2013.01); *H04L 67/12* (2013.01); *H04L 67/2842* (2013.01); *H04L 67/28* (2013.01); *H04L 63/08* (2013.01); *H04L 2463/101* (2013.01); *H04W 4/00* (2013.01); *H04W 88/182* (2013.01)

(58) Field of Classification Search
USPC .......................................................... 709/201
See application file for complete search history.

(56) References Cited

U.S. PATENT DOCUMENTS

| | | | | | |
|---|---|---|---|---|---|
| 5,828,738 | A | * | 10/1998 | Spaeth ........................ | 379/130 |
| 6,366,220 | B1 | * | 4/2002 | Elliott ......................... | 340/928 |
| 2002/0138423 | A1 | * | 9/2002 | Takatori et al. ............. | 705/39 |
| 2003/0028790 | A1 | * | 2/2003 | Bleumer et al. ............. | 713/189 |

(Continued)

OTHER PUBLICATIONS

Östergren Mattias, Sound Pryer: Adding Value to Traffic Encounters with Streaming Audio, Lecture Notes in Computer Science, Springer Berlag, Berlin, DE, vol. 3166, Sep. 1, 2004.

(Continued)

*Primary Examiner* — Brian P Whipple
*Assistant Examiner* — James Edwards
(74) *Attorney, Agent, or Firm* — Coats & Bennett, P.L.L.C.

(57) ABSTRACT

Methods and apparatus for distributing multimedia files units are disclosed. In an exemplary method, a plurality of multimedia files are downloaded using a transportation provider wireless device associated with a fare-based transport vehicle, such as a taxi, bus, ferry, or airplane. The downloaded multimedia files are stored in a data storage unit operatively connected to the transportation provider wireless device. In response to passenger input data received from a passenger wireless device, a desired multimedia file selected by the passenger is transferred to the passenger wireless device or played back using local speakers and/or video displays. In some embodiments, a selected multimedia file is associated with digital rights management information regulating authorized uses of the file.

31 Claims, 6 Drawing Sheets

(56) References Cited

U.S. PATENT DOCUMENTS

| | | | |
|---|---|---|---|
| 2003/0093798 A1* | 5/2003 | Rogerson | 725/75 |
| 2003/0139941 A1* | 7/2003 | Matsumoto | 705/1 |
| 2003/0233278 A1* | 12/2003 | Marshall | 705/14 |
| 2004/0036622 A1* | 2/2004 | Dukach et al. | 340/691.6 |
| 2004/0117484 A1* | 6/2004 | Singer et al. | 709/225 |
| 2004/0143624 A1* | 7/2004 | Kusano et al. | 709/201 |
| 2004/0235521 A1* | 11/2004 | Pradhan et al. | 455/558 |
| 2004/0249961 A1* | 12/2004 | Katsube et al. | 709/229 |
| 2004/0259565 A1* | 12/2004 | Lucidarme | 455/453 |
| 2005/0173513 A1* | 8/2005 | Kitamura et al. | 235/375 |
| 2005/0216938 A1 | 9/2005 | Brady, Jr. et al. | |
| 2005/0219208 A1* | 10/2005 | Eichenberger et al. | 345/157 |
| 2006/0168227 A1* | 7/2006 | Levine et al. | 709/226 |
| 2006/0179457 A1 | 8/2006 | Brady, Jr. et al. | |
| 2006/0206610 A1* | 9/2006 | Ling et al. | 709/226 |
| 2006/0218226 A1* | 9/2006 | Johnson et al. | 709/202 |
| 2007/0015485 A1* | 1/2007 | DeBiasio et al. | 455/345 |
| 2007/0044010 A1* | 2/2007 | Sull et al. | 715/500.1 |
| 2008/0014908 A1* | 1/2008 | Vasant | 455/414.1 |
| 2008/0052233 A1* | 2/2008 | Fisher et al. | 705/40 |
| 2008/0082688 A1* | 4/2008 | Yi et al. | 709/246 |
| 2008/0167060 A1* | 7/2008 | Moshir et al. | 455/466 |
| 2009/0060033 A1* | 3/2009 | Kimmich et al. | 375/240.02 |
| 2009/0106346 A1* | 4/2009 | Klein et al. | 709/201 |
| 2009/0177542 A1* | 7/2009 | Haberman et al. | 705/14 |
| 2009/0228908 A1* | 9/2009 | Margis et al. | 725/6 |
| 2010/0017827 A1* | 1/2010 | Shalam et al. | 725/75 |
| 2010/0161403 A1* | 6/2010 | Fisher et al. | 705/14.38 |

OTHER PUBLICATIONS

International Search Report mailed Mar. 16, 2009 in connection with International Application No. PCT/US2008/057482 filed Mar. 19, 2008.

\* cited by examiner

DISTRIBUTION OF MULTIMEDIA FILES USING A TRANSPORTATION PROVIDER WIRELESS DEVICE

RELATED APPLICATION

This application claims the benefit of U.S. Provisional Patent Application 60/956,036 filed Aug. 15, 2007, which is incorporated herein by reference.

BACKGROUND

The present invention relates generally to the distribution of multimedia files to portable wireless devices, and more particularly relates to distributing multimedia files to portable wireless devices using a wireless unit associated with a transportation provider.

With the continuously evolving capabilities of the Internet, consumers and their Internet-enabled devices are developing growing appetites for bandwidth-intensive applications. One of these applications is the distribution of multimedia files such as short movie clips or even full-length feature films.

Wireless network technology is also evolving rapidly, although the bandwidths currently available for multimedia applications tend to lag behind those available in fixed networks. Wide-area wireless networks, such as Wideband-CDMA networks conforming to standards developed by the $3^{rd}$ Generation Partnership Project (3GPP), are evolving to offer increased bandwidth and promise to support varied multimedia applications. At the same time, advanced local-area wireless technology is also evolving, offering even greater bandwidth capabilities.

Although evolving wide-area wireless networks offer more and more bandwidth, the ultimate capacity of these networks is limited by practical considerations. In particular, the capacity is limited by the rate of re-use of wireless spectrum. This re-use can be increased by increasing the complexity of the wireless technology, increasing the number of base stations used, or both. Either approach imposes significant costs, such that downloading large multimedia files over these wide-area networks may be prohibitively costly for some applications.

Often, the same multimedia content will be desired by many users, and thus repeatedly accessed. Besides being costly, repeated transmission of this content over wide-area wireless networks is wasteful of the spectrum resources, and may cause the performance of the network to suffer, especially during peak demand periods.

On the other hand, personal and local area technologies, such as wireless local area network (WLAN) technology or Bluetooth technology, tend to be less expensive to operate. However, the range of these technologies is limited, and conventional technologies require that the wireless access point be fixed, and connected to a wired Internet access point, in order to provide real-time access to the broad range of applications and data available on the Internet. Thus, although transmission of multimedia content to a subscriber device using wireless local area technologies is relatively fast and cost effective, availability of specific content often depends upon whether the subscriber is within range of a fixed access point providing access to the Internet.

SUMMARY

Methods and apparatus are disclosed for distributing multimedia files using a transportation provider wireless device associated with a fare-based transport vehicle. In an exemplary method, a plurality of multimedia files are downloaded using the transportation provider wireless device and stored in a data storage unit operatively connected to the transportation provider wireless device. Passenger input data, including a file selection corresponding to a desired multimedia file, is received from a passenger wireless device. The desired multimedia file is output in response to the passenger input data.

In some embodiments, the desired multimedia file is transferred to the passenger wireless device in response to the passenger input data. In other embodiments, outputting the desired multimedia file comprises reproducing audio corresponding to audio data included in the desired multimedia file, using one or more loudspeakers installed in the fare-based transport vehicle. In yet other embodiments, video is displayed on a vehicle-installed video display, using video data included in the desired multimedia file. Playing back the multimedia file or transferring the multimedia file to the passenger wireless device may be subject to digital rights management (DRM) information associated with the desired multimedia file. This DRM information may define authorized uses for the multimedia file, and in some embodiments may be transferred to the passenger wireless device along with the corresponding multimedia file.

In one or more embodiments of the invention, a fare is calculated based on transportation provided and price data associated with the desired multimedia file. In several embodiments, one or more credits may be applied to this fare based on one or more additional multimedia files, such as commercial advertisements, transferred to or viewed by the passenger, or in return for one or more multimedia files received from the passenger wireless device. In certain embodiments, electronic payment information is received from the passenger wireless device.

A multimedia distribution system is also disclosed. The disclosed multimedia distribution system comprises a wireless transceiver associated with a fare-based transport vehicle and configured to download a plurality of multimedia files, a data storage unit operatively connected to the wireless transceiver and configured to store the downloaded multimedia files, a passenger device interface configured to receive passenger input data from a passenger wireless device, and a distribution section configured to output a selected multimedia file in response to the passenger input data.

The distribution system may comprise a transmitter section configured to transfer the desired multimedia file to the passenger wireless device. In one or more embodiments, the transmitter section may comprise a short-range wireless transceiver. The distribution system may comprise an audio output section and/or a video output section.

DETAILED DESCRIPTION

Figure 1:
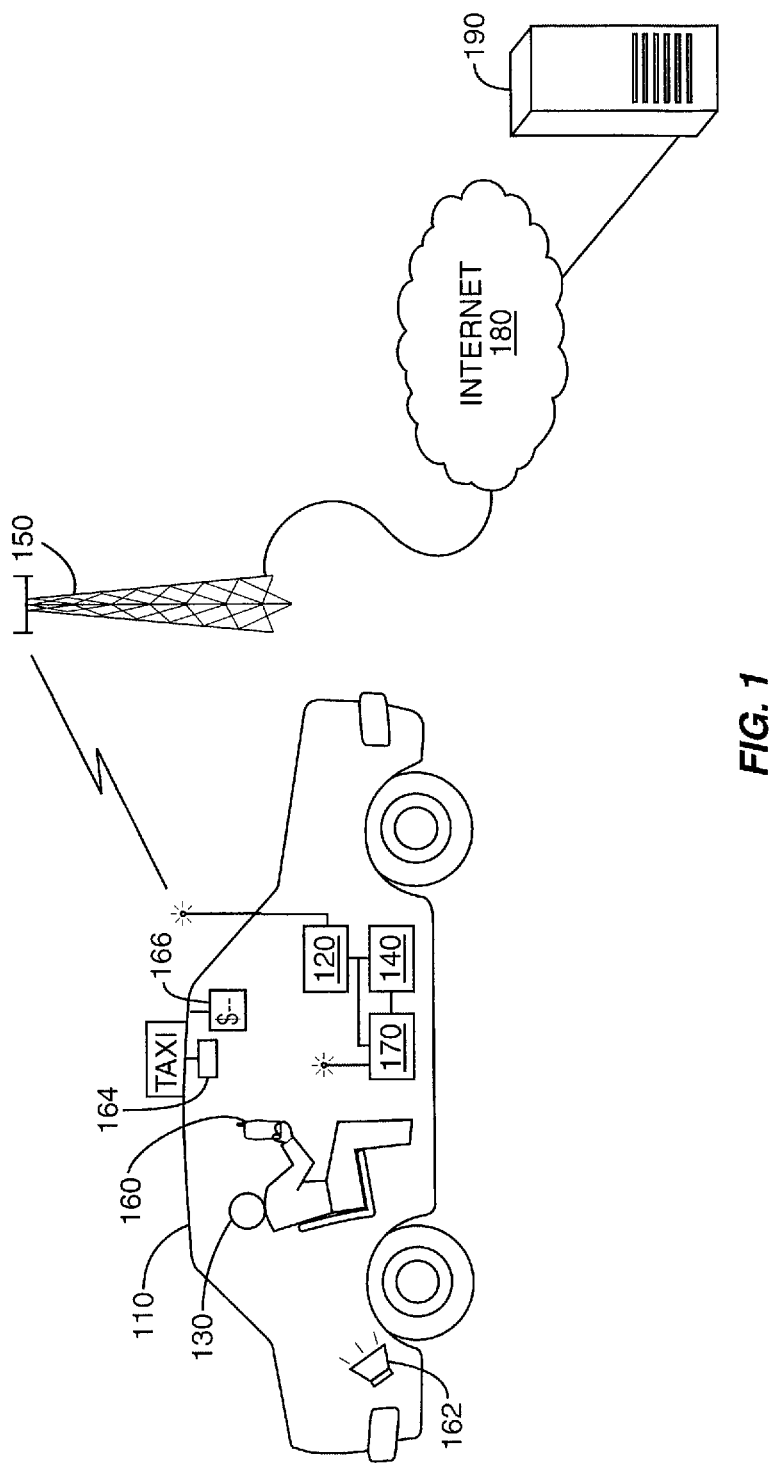
FIG. 1 illustrates components of a system for distributing multimedia files in accordance with one or more embodiments of the invention.

While the invention is susceptible to various modifications and alternative forms, specific embodiments thereof are shown by way of example in the drawings and will be described in detail below. It should be understood, however, that there is no intent to limit the invention to the particular forms described in detail. Those skilled in the art will recognize various alternatives to the illustrated embodiments falling within the scope of the claims.

FIG. 1 provides an overview of an approach to distributing multimedia files in accordance with the present invention. In FIG. 1, vehicle 110 is operating as a taxicab, and is associated with wireless device 120. Wireless device 120, which is typically a mobile terminal supporting one or more wireless data standards, may be a personal phone belonging to the driver (not shown) of vehicle 110. Alternatively, wireless device 120 might belong to the owner of vehicle 110, the taxi company, a contractor of the taxi company, or the like. In any event, wireless device 120 is associated with the transportation provider, and travels with vehicle 110 as it provides transportation for various passengers, such as passenger 130.

Wireless device 120 is operatively connected to data storage unit 140, which is configured to store several multimedia files, such as digital audio files, digital video files, and the like. These multimedia files may comprise movie files, music files, tourist information, restaurant or attractions guides, and the like. Although wireless device 120 may include a substantial quantity of internal memory, a separate data storage unit 140 may nonetheless be necessary to provide adequate memory for storing dozens, hundreds, or even thousands of multimedia files.

Wireless device 120 is configured to download multimedia files wirelessly, from base station transmitter 150. Base station transmitter 150, in turn, is connected to the Internet 180, to which the server 190 of the multimedia files is also connected. Wireless device 120 and base station transmitter 150 are typically compatible with one or more wireless telecommunications standards, such as those promulgated by the $3^{rd}$-Generation Partnership Project (3GPP). For example, wireless device 120 and base station transmitter 150 may support 3GPP's High-Speed Downlink Packet Access, which provides downlink data rates of 7.2 Mbits/sec or more.

Also connected to data storage unit 140 is short-range transceiver 170, which is configured to discover and to communicate with compatible transceivers in other devices. Short-range transceiver 170 may include Bluetooth technology, ultra-wideband (UWB) technology, or other personal-area network technology, or may include wireless local-area network (WLAN) technology. Using short-range transceiver 170, multimedia files stored in data storage 140 may thus be wirelessly transferred to nearby devices.

One such device is also illustrated in FIG. 1. Passenger 130 carries a portable wireless device 160, which typically serves as his personal mobile phone. Passenger wireless device 160 may also be equipped with wireless data capability, and thus technically capable of downloading multimedia files directly from base station 150. However, passenger wireless device 160 is also equipped with short-range radio technology, and can easily connect to short-range transceiver 170. Thus, it may be more convenient, less costly, or both, for passenger 130 instead to utilize the resources associated with the taxicab 110. Using the methods and systems described herein, passenger 130 may, in essence, "piggyback" on the capabilities of transportation provider wireless device 120 and data storage unit 140 to gain access to multimedia content.

Figure 2:
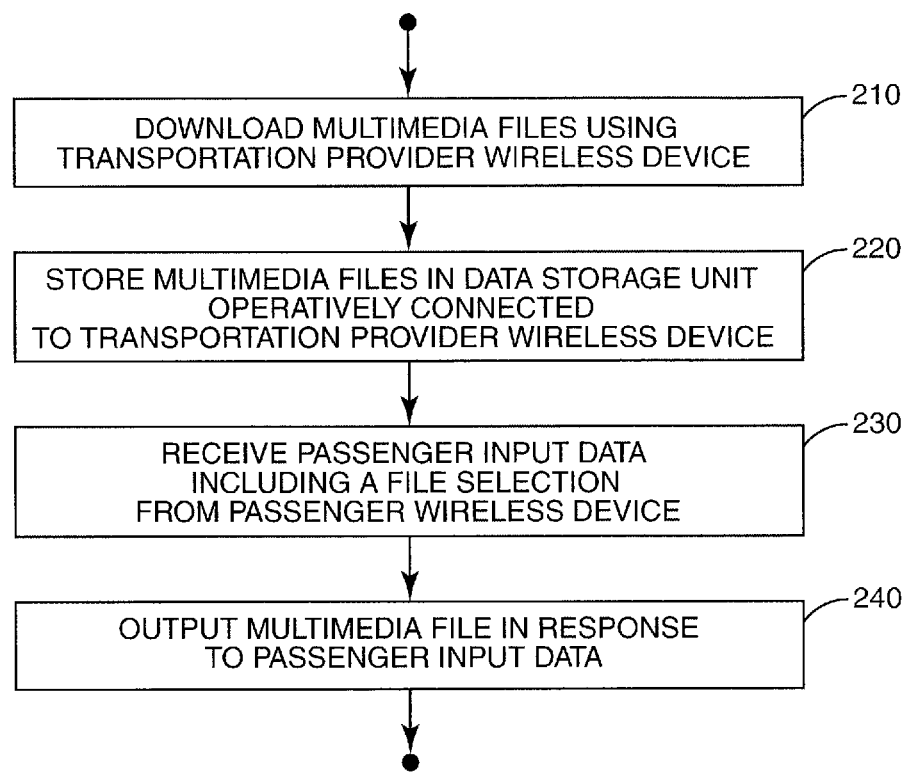
FIG. 2 is a flow diagram illustrating an exemplary method for distributing multimedia files according to one embodiment of the invention.

One approach for distributing multimedia content in accordance with the present invention is illustrated in the flow diagram of FIG. 2. Although the flow diagram of FIG. 2 is described below with reference to the components of FIG. 1, the invention is by no means limited to the particular configuration illustrated in FIG. 1.

The process begins at block 210, where several multimedia files are downloaded using transportation provider wireless device 120. As discussed above, transportation provider wireless device 120 is associated with a fare-based transport vehicle 110. Although vehicle 110 is depicted in FIG. 1 as a taxicab, vehicle 110 might alternatively be any public transport vehicle, or any vehicle providing transportation for a fare, such as a limousine, bus, ferry, or airplane.

In some cases, transportation provider wireless device 120 may be installed in the vehicle 110, so that it is only infrequently removed. In others, transportation provider wireless device 120 may simply be a portable mobile phone, which the operator of vehicle 110 may carry on his or her person. In either case, transportation provider wireless device 120 may be connected to the vehicle power supply, whether via a simple dashboard adaptor or via a more permanent connection, so that ample power is available for operating transportation provider wireless device 120 during the downloading operation. In either case, wireless device 120 may be coupled to one or more externally mounted antennas (not shown) for improved signal strength and the concomitant improved performance. Where multiple antennas are employed, receive diversity or multiple-input-multiple-output (MIMO) schemes may be employed to further improve performance and data throughput.

A number of wide-area wireless data technologies are suitable for the downloading operation of block 210. These include, for example, High-Speed Downlink Packet Access technology, standardized by 3GPP and currently deployed in many locations. Emerging technologies, such as those under development in 3GPP's Long-Term Evolution (LTE) project, will offer even higher data rates, for faster downloading of multimedia files.

Downloaded multimedia files are stored in data storage unit 140 at block 220. The optimal size for data storage unit 140 depends on the type and quantity of multimedia files—a few gigabytes of memory may be adequate for storing dozens of digital audio files, while hundreds of gigabytes may be required for storing a catalog of digital video files. The optimal configuration of data storage unit 140 will also depend on the type and quantity of multimedia files. In some cases, data storage unit 140 may simply be one or more memory devices built into the wireless device 120, such as flash memory or a miniature disk drive. Data storage unit 140 may also comprise, in whole or in part, removable memory modules installed in transportation provider wireless device 120. In either of these configurations, data storage unit 140 is electrically connected to transportation provider wireless device 120.

Alternatively, data storage unit 140 may comprise, in whole or in part, a memory device separate from, but operatively connected to, transportation provider wireless device 120. For example, data storage unit 140 may comprise a disk drive device, having a storage capacity measured in hundreds of gigabytes, connected by cable to transportation provider wireless device 120. Such a disk drive device will likely draw its power requirements from the vehicle power supply, rather than from transportation provider wireless device 120. In yet other embodiments, this separate data storage unit 140 may be wirelessly connected to transportation provider wireless device 120. This connection may use, for example, WLAN technology or short-range radio technology such as Bluetooth, UWB technology, or the like.

By downloading and storing a number of multimedia files, as described above, a vehicle operator can build a catalog of informational and/or entertaining multimedia content that can be offered to passengers of vehicle 110. Thus, the vehicle operator can provide a "mobile kiosk," offering a variety of multimedia files for passenger use. With the addition of basic server functionality, this content can be offered for immediate listening and/or viewing, or for transfer to a passenger's wireless device 160 for later use. The short-range radio technology included in passenger wireless device 160, whether WLAN, Bluetooth, or the like, provides a convenient means for collecting passenger input as well as for transferring files to the passenger wireless device 160.

Thus, at block 230, passenger input data is received from passenger wireless device 160. Typically, passenger wireless device 160 is first discovered by short-range transceiver 170. Then, using the short-range radio link and the display screen of wireless device 160, passenger 130 is provided with a user interface that allows him to browse the contents of data storage unit 140 and to select a desired multimedia file. Techniques for facilitating the discovery of one wireless device by another and for providing access to the contents of a wirelessly connected database are well known to those skilled in the art, and thus are not described in detail herein.

In response to the passenger input data received from the passenger wireless device 160 at block 230, a selected multimedia file is output at block 240. In one or more embodiments, the multimedia file is played back immediately, using audio or video equipment installed in the vehicle 110 and connected to data storage unit 140. For instance, a selected digital audio file may be played back using a loudspeaker 162 installed in the passenger compartment of vehicle 110, as shown in FIG. 1. Alternatively, audio may be sent to a headset. Similarly, video data from the selected multimedia file may be displayed using a video display 164 installed in the vehicle. Video display 164 might, for example, be installed overhead, as shown in FIG. 1, or in a seat back of vehicle 110, facing passenger 130. Audio or video may be routed to playback devices utilizing electrical connections or short-range wireless connections.

In other embodiments, the selected multimedia file is output as a streaming file, for rendering (i.e. playback) at the passenger wireless device 160. In this scenario, audio is reproduced using speakers, headsets, and/or earpieces associated with the passenger wireless device 160, and video may be reproduced using the display of passenger wireless device 160. Streaming of the multimedia file to passenger wireless device 160 will be limited to the range of short-range transceiver 170, and will terminate when passenger 130 departs vehicle 110 and falls outside its range.

In yet other embodiments, the multimedia file in its entirety is output, i.e. transferred, to passenger wireless device 160, using the short-range transceiver 170. A multimedia file thus transferred is available to passenger 130 for immediate playback, using passenger wireless device 160, or for later use.

In some cases, the permissible uses of a multimedia file downloaded to data storage unit 140 may be limited. For example, the transportation provider may only be licensed by the holder of a file's copyright to play back the file in the vehicle 110, and not to transfer the file to passenger wireless device 160. Other multimedia files might be associated with restrictions that prohibit "performance" of the file in the vehicle, but permit transferring the file to passenger wireless device 160 for a fee.

Figure 3:
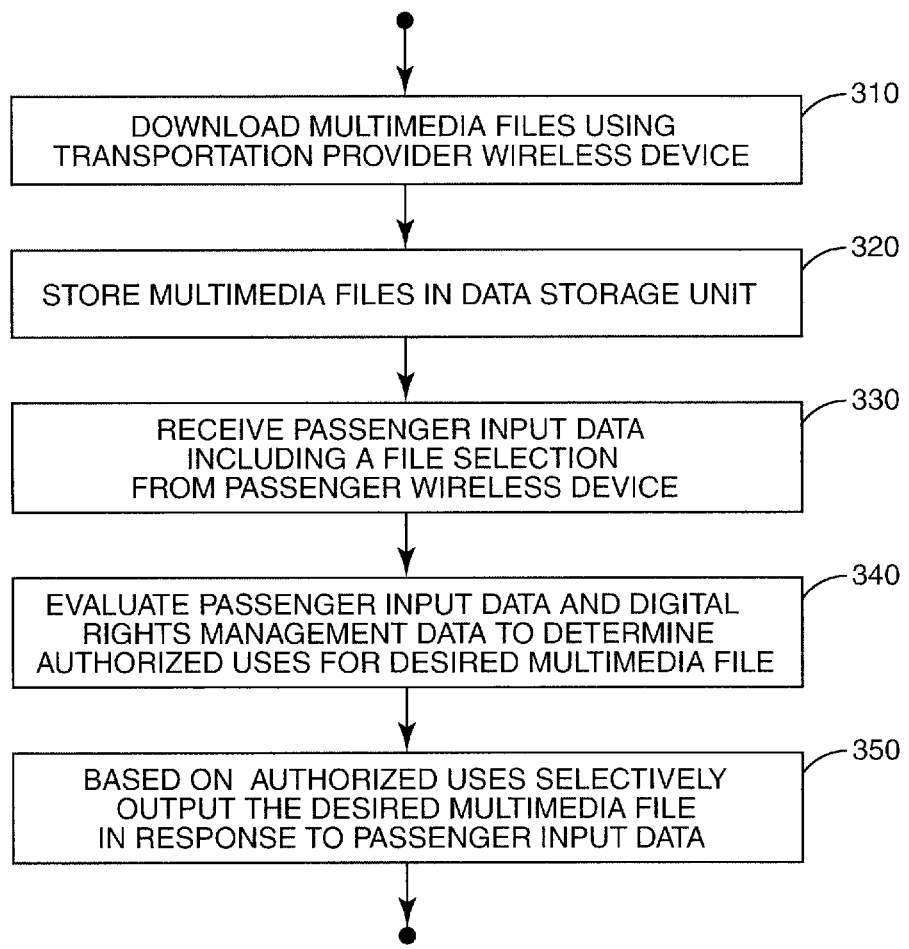
FIG. 3 is a flow diagram illustrating another exemplary method for distributing multimedia files.

FIG. 3 thus illustrates an exemplary method for distributing multimedia files having associated digital rights management (DRM) information that indicates authorized uses of the files. At block 310, multimedia files are downloaded, using transportation provider wireless device 120. The downloaded files are stored in data storage unit 140 at block 320, just as described previously. However, in this case DRM information is associated with one or more of the downloaded multimedia files. The DRM information is typically downloaded along with the corresponding multimedia files, and may vary with each. Thus, some files may be completely unrestricted, while others are associated with specific restrictions, permitting certain authorized uses, while prohibiting other uses. In other cases, DRM information may be associated with a multimedia file separately from the downloading process. For example, a DRM rule may be associated with a category of multimedia files, such as those from a particular vendor, so that the rule is automatically applied to a file after it is downloaded.

The method of FIG. 3 continues at block 330 with the receiving of passenger input data, including a file selection, from passenger wireless device 160. As discussed earlier, passenger 130 may be presented with a user interface that allows him to browse the contents of data storage unit 140 and to make a file selection. The appearance of the user interface may in this case be modified to reflect the authorized uses. For example, the authorized uses may be displayed along with the multimedia titles. Alternatively, multimedia titles may be grouped according to authorized use, so that, for example, files available for immediate playback are easily recognized and quickly accessed.

At block 340, the passenger input data and the DRM information are evaluated to determine the authorized uses for the desired multimedia file. In some cases, this evaluation may comprise two distinct steps. For example, the DRM information may be first evaluated to determine the authorized uses before a user interface is presented to passenger 130. After determining which uses are authorized, a user interface is provided that only presents authorized uses as selectable options. Using this approach, invalid passenger selections may be avoided.

In other embodiments, a passenger may be permitted to select a multimedia title or group of titles, after which authorized uses are determined for that selection based on the passenger input data, e.g., the passenger file selection, and DRM information associated with the desired file or group of files. Authorized uses may also depend on other information provided as part of the passenger input data, such as a user name and/or password, a digital certificate, or other electronic credentials.

At block 350, the multimedia file is selectively output, based on the authorized uses, in response to passenger input data received from passenger wireless device 160. When permitted by the associated DRM information, the multimedia file may be played back locally, using one or more vehicle-installed speakers 162 and/or video displays 164. When permitted by the associated DRM information, the file may be streamed or transferred to passenger wireless device 160. When a file subject to DRM restrictions is transferred, DRM information may be transferred along with the file, so that the DRM information remains associated with the file.

The above described methods may be used to provide to passengers a service that is included in a transportation service, at no additional charge. Alternatively, distribution of multimedia files according to the present invention may be a value-added service for which the transportation provider charges an additional fee.

In some applications, a fee associated with playback or transfer of a selected multimedia file may be assessed along with the fare. In taxi 110, for example, a fee associated with the "purchase" of a multimedia file can be considered in calculating a total fare. Thus, the fare presented to passenger 130 is based on both the transportation provided as well as price data associated with the desired multimedia file. This price data may include a different price for local playback of the file than for transfer of the file to passenger wireless device 160.

Figure 4:
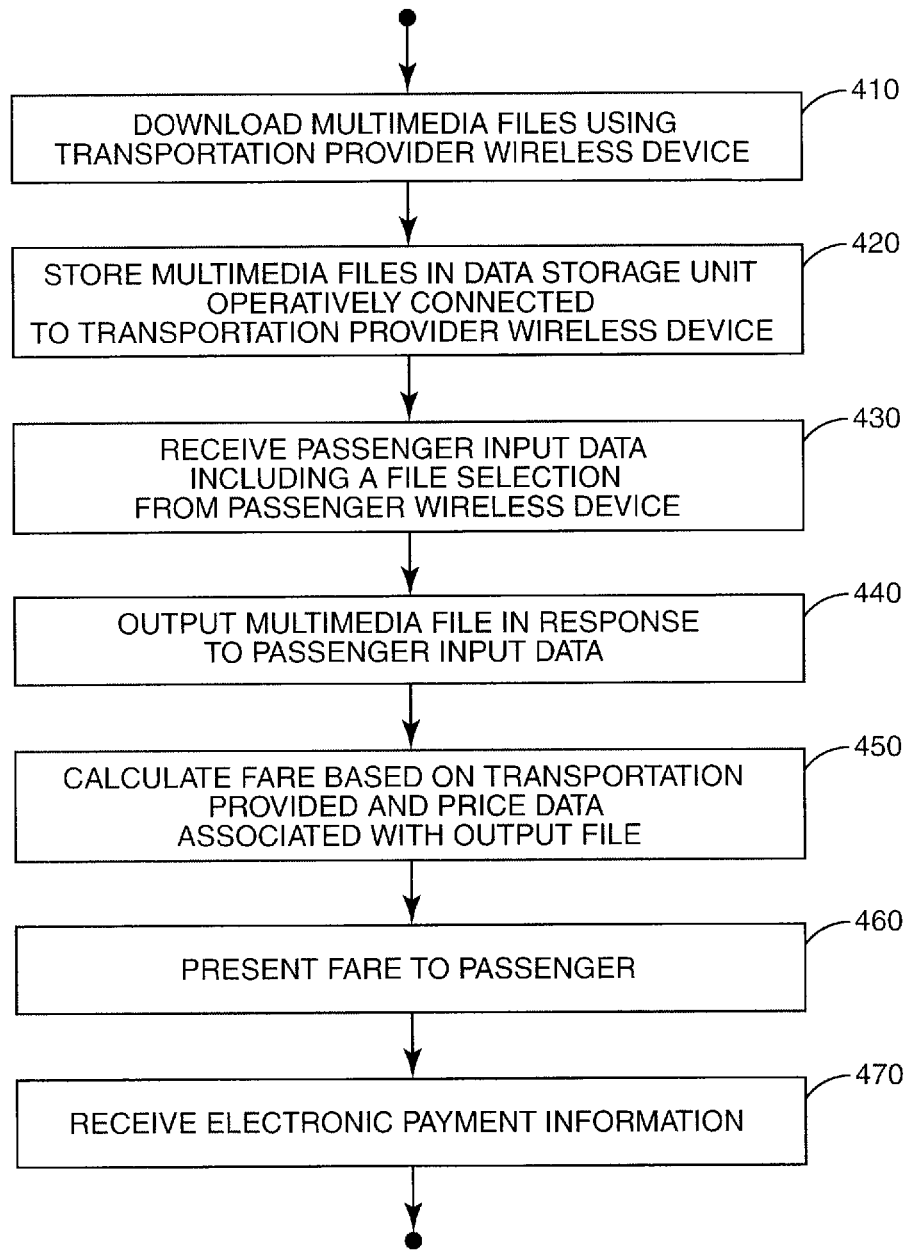
FIG. 4 is a flow diagram illustrating another exemplary method for distributing multimedia files.

This fare calculation step is illustrated in the flow diagram of FIG. 4, which illustrates another exemplary method for distributing multimedia files according to the invention. Multimedia files are downloaded and stored at blocks 410 and 420, as with the previously discussed methods. Similarly, passenger input data is received at block 430 and a selected multimedia file is output at block 440, again as previously described. At block 450, a fare is calculated, based on the transportation provided as well as price data associated with the file outputted for passenger 130. The price data may comprise several different fees that depend on the particular use of the multimedia file. For example, a low rate may be charged for viewing or listening to a multimedia file while riding in vehicle 110, while a significantly higher rate is charged for transferring the multimedia file to passenger wireless device 160. The rates charged for transferring the multimedia file may also vary depending on the rights granted along with the file; these rights can be enforced using DRM information transferred with the file. This DRM information transferred with the file may be customized for the passenger, perhaps depending on which of several prices is selected by the passenger.

In some embodiments, the total fare thus calculated may be electronically presented to passenger 130, as shown at block 460. For example, a taxi meter 166, as shown in FIG. 1, might be modified to present a total fare that includes the price of transportation and the price associated with the playback, streaming, or transfer of the selected multimedia file. In some embodiments, this might be a "virtual" meter display, perhaps appearing on a video display 164 installed within the vehicle 110, or transferred to passenger wireless device 160 via short-range transceiver 170 and shown on the device display.

In one or more embodiments of the invention, the passenger wireless device 160 is configured to provide electronic payment information so that a fare can be settled using the same equipment and wireless links used for distributing the multimedia file. Thus, an electronic balance is transferred to passenger wireless device 160 for inspection by passenger 130. Next, electronic payment information is received from passenger wireless device 160, as shown at block 470. This electronic payment information may include debit or credit card information, or other information indicating that an account be charged. The electronic payment may include authorization and/or authentication information proving that passenger wireless device 160 and/or passenger 130 are authorized to perform the transaction. In some cases, all or part of the electronic payment information may be relayed to a payment server for processing and/or verification, using the wireless data capabilities of the transportation provider wireless device 120.

In some embodiments, the electronic balance or the electronic payment information, or both, may be transferred using near-field communications (NFC) technology. NFC technology is well known to those skilled in the art. Typically, NFC operates by magnetic field induction, using an unlicensed radio-frequency band, at a maximum distance of several inches. As will be readily appreciated by those skilled in the art, NFC is particularly suited for point-of-sale transactions involving a kiosk and a portable user device, and facilitates the convenient transfer of electronic payment information as described herein.

In yet other embodiments, the fare charged to a passenger may be offset by one or more credits. For instance, a passenger's fare may be subsidized, in whole or in part, by commercial advertisers. In return for viewing commercial advertisements using, for example, video display 164, a credit may be applied against the transportation fare. In certain embodiments, a credit may also be applied for multimedia files uploaded from the passenger wireless device 160 for distribution to subsequent passengers.

Figure 5:
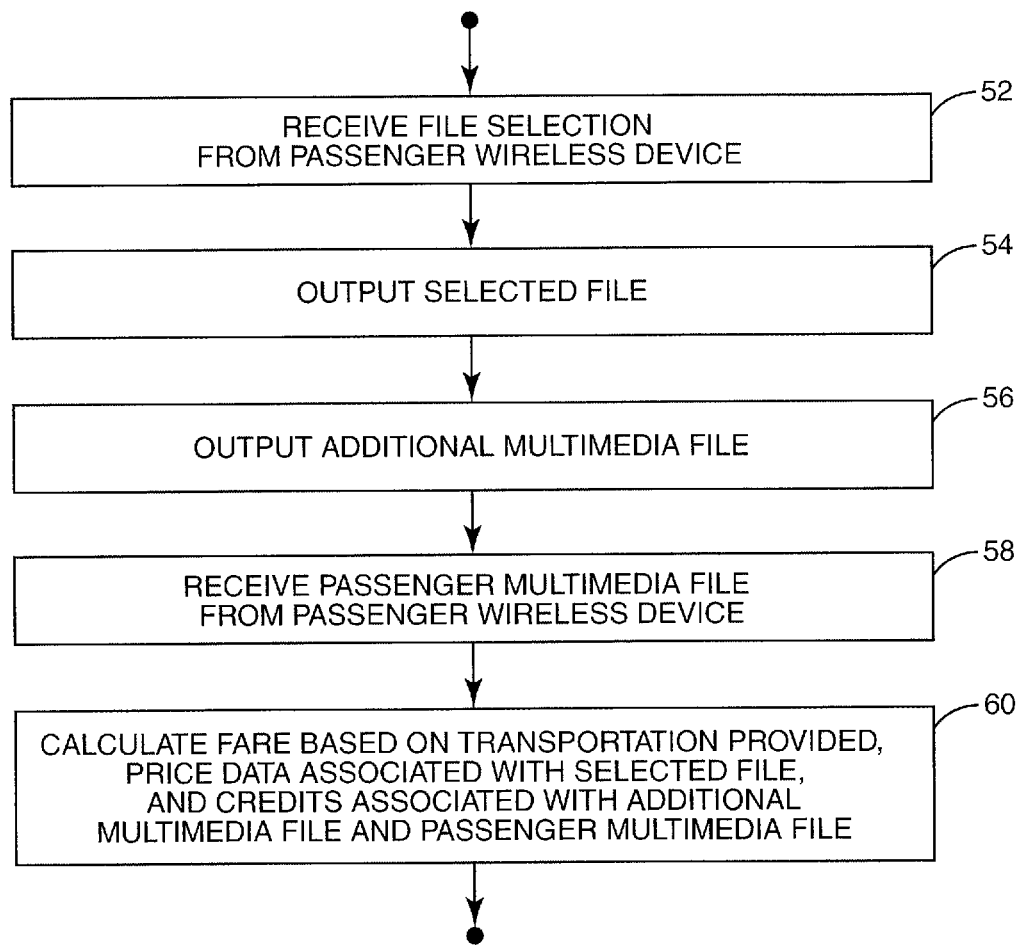
FIG. 5 is a flow diagram illustrating an exemplary method for calculating a fare according to one or more embodiments of the invention.

FIG. 5 illustrates a flow diagram illustrating an exemplary method for calculating a fare, including application of the credits discussed above. At block 52, a file selection is received from the passenger wireless device, in the same manner as discussed earlier. This file selection may indicate a multimedia file that the passenger wishes to view or hear immediately, via the speaker 162 or video display 164, or may instead indicate a file that the passenger wishes to be transferred to passenger wireless device 160. At block 54, the selected file is output according to the passenger input data and any relevant DRM information.

At block 56, an additional multimedia file is output. This additional file may comprise a commercial advertisement, provided, for example, by a commercial partner of the transportation provider. In return for facilitating the distribution of this commercial message, the sponsor may subsidize the distribution of the file selected by the passenger. This subsidy may take the form of a credit applied against the purchase or "rental" price associated with the selected file. Thus, in return for viewing one or more commercial messages, the passenger may receive a discount applied to his primary purchase. Indeed, in some circumstances, the discount may be such that it serves to discount the fare for his travel, as well.

At block 58, a passenger multimedia file is received from passenger wireless device 160. This passenger multimedia file may have been previously rented or purchased from another content provider, and may be of interest to the transportation provider system for further distribution to subsequent passengers. In this manner, the passenger wireless device 160 and the multimedia distribution system operated by the transportation provider act as components in an "ad-hoc" distribution system.

The passenger multimedia file may contain or be associated with DRM information that permits distribution by the passenger wireless device 160 and by subsequent distributors. That DRM information may impose various restrictions on subsequent distribution and/or performance, which may include requirements that a fee be paid to the content originator, to the passenger 130, or both. Thus, a credit may be due to the passenger 130 in return for the file received from his device 160.

Accordingly, at block 60, a fare is calculated for the passenger 130, based on the transportation provided to him, and based on price information associated with the file selected by him and output to his device 160 or to audio/video devices 162 and/or 164. In addition, any credits due to passenger 130 are also applied to the calculated fare, based on the additional multimedia file output at block 56 and the passenger multimedia file received at block 58.

Figure 6:
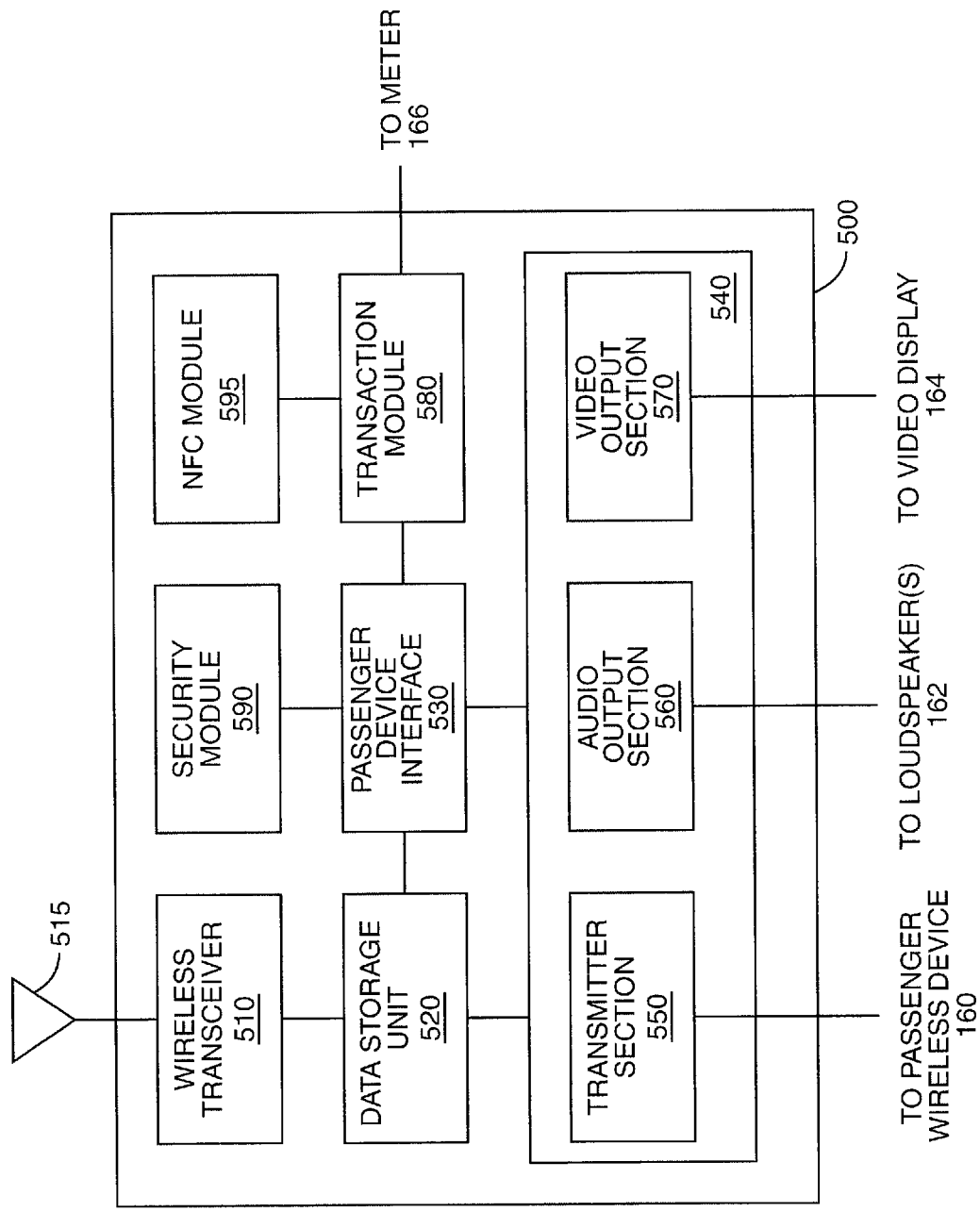
FIG. 6 is a block diagram illustrating one embodiment of a multimedia distribution system.

FIG. 6 illustrates a multimedia distribution system 500 configured in accordance with one or more embodiments of the present invention. Multimedia distribution system 500 comprises a wireless transceiver 510, coupled to antenna 515, configured to download multimedia files and to store them in data storage unit 520. Wireless transceiver 510 may be, for example, a portable wireless phone or a mobile terminal installed semi-permanently in vehicle 110, which supports one or more wireless data standards, such as 3GPP's High-Speed Packet Access. Wireless transceiver 510 may be powered by a portable battery (not shown) or may draw power from a connection to a vehicle-based power supply (not shown).

In one or more embodiments, data storage unit 520 comprises a hard disk drive or other non-volatile memory unit configured to store a library of multimedia files. In order to provide adequate storage space, data storage unit 520 may comprise tens or hundreds of gigabytes of storage space. In addition, data storage unit 520 may be extendable, so that additional memory capacity can be added as needed. Indeed, memory of different types may be combined to provide data storage unit 520. For example, data storage unit 520 may include memory internal to wireless transceiver 510, but might also include a removable memory card installed in wireless transceiver 510. The capacity provided by internal memory and one or more removable memory cards may be extended by an external storage device, such as the hard-disk drive discussed above.

Data storage unit 520 may be electrically or wirelessly connected to wireless transceiver 510. In some embodiments, wireless transceiver 510 is semi-permanently installed on vehicle 110, or temporarily installed in a docking station providing electrical connections to at least the vehicle's power supply. In these embodiments, data storage unit 520 may be electrically connected to wireless transceiver 510. This electrical connection may use an electrical interface specific to the model or manufacturer of wireless transceiver 510, but preferably uses a standard electrical interface, such as the Universal Serial Bus (USB).

Alternatively, data storage unit 520 is not electrically connected to wireless transceiver 510, but is only connected wirelessly, using a short-range wireless technology. This wireless link may use a wireless interface specific to the model or manufacturer of wireless transceiver 510, but preferably uses one or more standardized wireless interfaces, such as Certified Wireless USB or an appropriate Bluetooth profile.

Multimedia distribution system 500 also includes passenger device interface 530, which controls communications and transactions between multimedia system 500 and passenger wireless device 160. Passenger device interface 530, which may be implemented as software or firmware running on one or more microcontrollers or microprocessors, is configured to receive passenger input data from a passenger wireless device and to manage the outputting of one or more multimedia files in response to a file selection included in the passenger input data.

Passenger device interface 530 may include one or more protocol stacks for communicating with passenger wireless device 160. For example, passenger device interface 530 may be connected to a Bluetooth transceiver and support the Bluetooth Service Discovery Profile and the Bluetooth File Transfer Profile. With these profiles, a link to passenger wireless device 160 can be established, and passenger 130 is permitted to request, for example, the wireless transfer of one or more multimedia files from data storage unit 520 to passenger wireless device 160.

Multimedia distribution system 500 further comprises a distribution section 540 configured to output a desired multimedia file in response to passenger input data received from passenger wireless device 160. In the embodiment shown in FIG. 5, distribution section 540 comprises a transmitter section 550, audio output section 560, and video output section 570.

Transmitter section 550 is configured to transfer a multimedia file to passenger wireless device 160, under the control of passenger device interface 530. Transmitter section 550 typically comprises a short-range wireless transceiver, such as a Bluetooth, UWB, or WLAN transceiver. Audio output section 560 comprises circuitry for converting audio data included in a multimedia file into audio signals for driving one or more loudspeakers, earpieces or headsets. In one or more embodiments, audio output section 560 comprises electrical outputs wired to loudspeakers installed in vehicle 110. Similarly, video output section 570 comprises circuitry for converting video data included in a multimedia file into video signals for driving a video display. Audio output section 560 and video output section 570 may comprise decoder software and/or hardware for decoding audio or video information encoded using any of a variety of standards, such as MP-3 or AAC for audio and MPEG-4 or AVC for video.

Multimedia distribution system 500 also comprises a transaction module 580, configured to calculate a fare based on transportation provided as well as price data associated with a multimedia file selected by passenger 130. In addition, transaction module 580 may be configured to apply one or more credits to the calculated fare, based on commercial advertisements transferred to passenger wireless device 160 or viewed by passenger 130 on video display 164, or based on one or more multimedia files received from passenger wireless device 160. Transaction module 580 may be implemented as software or firmware running on one or more microcontrollers or microprocessors, and may be implemented using the same circuitry as passenger device interface 530. In one or more embodiments, transaction module 580 comprises an interface to a taxi meter 166, through which it receives fare information for the transportation provided to passenger 130. In other embodiments, transaction module 580 receives transportation fare information through another communications interface.

The fare computed by transaction module 580 may be presented to passenger 130 by sending fare information to passenger wireless device 160, using passenger device interface 530. Alternatively, the fare may be communicated to an external display device for presentation to passenger 130. The fare may be presented using taxi meter 166, for example, or may be presented on video display 164, which is also used for playback of video files.

Transaction module 580 may also be configured to receive electronic payment information from passenger wireless device 160, via the passenger device interface 530. In this case, transaction module 580 is configured to settle the fare using the received electronic payment information, which may include credit or debit card information as well as authorization or authentication information. Transaction module 580 may be configured to communicate with a financial service using the wireless transceiver 510, or may be configured to store the electronic payment information for later processing. Transfer of the fare to passenger wireless device 164 or the transfer of electronic payment device to multimedia distribution system 500 may be performed using the same short-range wireless technology employed by transmitter 550. Alternatively, either transfer, or both, may be performed using NFC module 595. As will be appreciated by those skilled in the art, using NFC module 595 may be inherently more secure, or may simply provide more convenient access to an electronic payment system implemented in passenger wireless device 160.

Finally, multimedia distribution system 500 comprises a security module 590, which is configured to selectively limit outputting of a desired multimedia file by the distribution section in response to DRM information associated with the desired file. Security module 590 is typically tightly coupled with passenger device interface 530, and may be implemented with software or firmware running on the same processor. Security module 590 may also comprise tamper-resistant hardware for storing encryption keys and/or security certificates.

Security module 590 is configured to read and interpret DRM information stored with one or more multimedia files. As discussed above, the DRM information may restrict processing of a file to certain authorized uses. Security module 590 enforces these restrictions, by limiting the selection choices presented to passenger 130 via the passenger device interface 530, or limiting the operation of distribution section 540, or both.

Those skilled in the art will recognize that several of the functional elements of multimedia distribution system 500 described above may be implemented on one or more microcontrollers or microprocessors, and may be implemented together or separately, with appropriate applications program interfaces between them. One or more of these elements may be implemented on a processor embedded in the wireless transceiver 510, for example, or may be implemented on a processor embedded in fare meter 166. Alternatively, these elements may be implemented with a separate hardware device. Likewise, the short-range transceiver or transceivers discussed above may be included in wireless transceiver 510, or may comprise separate hardware under the control of the software-based modules described herein. Those skilled in the art will appreciate the cost, performance, and maintenance tradeoffs inherent in these design choices.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for distributing multimedia content, comprising:
    downloading a plurality of multimedia files using a transportation provider wireless device associated with a fare-based transport vehicle;
    storing the downloaded multimedia files in a data storage unit operatively connected to the transportation provider wireless device;
    receiving passenger input data from a passenger wireless device, the passenger input data including a file selection corresponding to a desired multimedia file; and
    outputting the desired multimedia file in response to the passenger input data, wherein outputting the desired multimedia file in response to the passenger input data comprises transferring the desired multimedia file from the data storage unit to the passenger wireless device.

2. The method of claim 1, wherein outputting the desired multimedia file in response to the passenger input data further comprises reproducing audio corresponding to audio data included in the desired multimedia file using one or more loudspeakers installed in the fare-based transport vehicle.

3. The method of claim 1, wherein outputting the desired multimedia file in response to the passenger input data further comprises displaying video corresponding to video data included in the desired multimedia file using one or more video displays installed in the fare-based transport vehicle.

4. The method of claim 1, wherein the data storage unit comprises a removable memory module installed in the transportation provider wireless device, and wherein storing the multimedia files comprises transferring the downloaded multimedia files to the removable memory module.

5. The method of claim 1, wherein the data storage unit comprises a memory device wirelessly connected to the transportation provider wireless device, and wherein storing the multimedia files comprises wirelessly transferring the downloaded multimedia files to the memory device.

6. The method of claim 1, further comprising calculating a fare based on transportation provided and price data associated with the desired multimedia file.

7. The method of claim 6, further comprising displaying the calculated fare using one or more video displays installed in the fare-based transportation vehicle.

8. The method of claim 6, further comprising transferring the calculated fare to the passenger wireless device.

9. The method of claim 1, further comprising receiving electronic payment information from the passenger wireless device.

10. The method of claim 9, wherein the electronic payment information is received from the passenger wireless device using near-field communications technology.

11. The method of claim 9, wherein the electronic payment information corresponds to a fare calculated based on transportation provided and price data associated with the desired multimedia file.

12. The method of claim 11, further comprising outputting one or more additional multimedia files, wherein the fare is further calculated based on a credit corresponding to the one or more additional multimedia files.

13. The method of claim 11, further comprising receiving one or more passenger multimedia files from the passenger wireless device, wherein the fare is further calculated based on a credit corresponding to the one or more passenger multimedia files.

14. A method for distributing multimedia content, comprising:
    downloading a plurality of multimedia files using a transportation provider wireless device associated with a fare-based transport vehicle;
    storing the multimedia files in a data storage unit operatively connected to the transportation provider wireless device;
    receiving passenger input data from a passenger wireless device, the passenger input data including a file selection corresponding to a desired multimedia file;
    evaluating the passenger input data and digital rights management (DRM) information associated with the desired multimedia file to determine authorized uses; and,
    based on the authorized uses, selectively outputting the desired multimedia file in response to the passenger input data.

15. The method of claim 14, wherein selectively outputting the desired multimedia file comprises transferring the desired multimedia file from the data storage unit to the passenger wireless device, if the authorized uses include such a transfer.

16. The method of claim 15, wherein selectively outputting the desired multimedia file further comprises transferring passenger DRM information to the passenger wireless device.

17. The method of claim 14, wherein selectively outputting the desired multimedia file comprises selectively restricting playback of the desired multimedia file using a vehicle-installed video display, a vehicle-installed loudspeaker, or both, based on the authorized uses.

18. A multimedia distribution system, comprising:
a wireless transceiver associated with a fare-based transport vehicle and configured to download a plurality of multimedia files;
a data storage unit operatively connected to the wireless transceiver and configured to store the downloaded multimedia files;
a passenger device interface configured to receive passenger input data from a passenger wireless device, the passenger input data including a file selection corresponding to a desired multimedia file; and
a distribution section configured to output the desired multimedia file in response to the passenger input data, wherein the distribution section comprises a transmitter section configured to selectively transfer the desired multimedia file to the passenger wireless device, based on the passenger input data.

19. The multimedia distribution system of claim 18, wherein the transmitter section comprises a short-range wireless transceiver.

20. The multimedia distribution system of claim 18, wherein the distribution section further comprises an audio output section configured to reproduce audio corresponding to audio data included in the desired multimedia file, using one or more loudspeakers installed in the fare-based transport vehicle.

21. The multimedia distribution system of claim 18, wherein the distribution section further comprises a video output section configured to display video corresponding to video data included in the desired multimedia file, using one or more video displays installed in the fare-based transport vehicle.

22. The multimedia distribution system of claim 18, wherein the distribution section is configured to selectively reproduce audio corresponding to audio data included in the desired multimedia file, using one or more loudspeakers installed in the fare-based transport vehicle, or transfer the desired multimedia file from the data storage unit to the passenger wireless device, or both, based on the passenger input data.

23. The multimedia distribution system of claim 18, wherein the distribution section is configured to selectively display video corresponding to video data included in the desired multimedia file, using one or more video displays installed in the fare-based transport vehicle, or transfer the desired multimedia file from the data storage unit to the passenger wireless device, or both, based on the passenger input data.

24. The multimedia distribution system of claim 18, wherein the data storage unit comprises a removable memory module installed in the transportation provider wireless device.

25. The multimedia distribution system of claim 18, wherein the data storage unit comprises a memory device wirelessly connected to the transportation provider wireless device.

26. The multimedia distribution system of claim 18, further comprising a transaction module configured to calculate a fare based on transportation provided and price data associated with the desired multimedia file.

27. The multimedia distribution system of claim 16, wherein the transaction module is further configured to calculate the fare based on a credit corresponding to one or more additional multimedia files received from the passenger wireless device.

28. The multimedia distribution system of claim 26, wherein the transaction module is further configured to calculate the fare based on a credit corresponding to one or more additional multimedia files output by the distribution section.

29. The multimedia distribution system of claim 26, wherein the transaction module is further configured to receive electronic payment information from the passenger wireless device via the passenger device interface.

30. The multimedia distribution system of claim 26, further comprising a near-field communications receiver operatively connected to the transaction module, wherein the transaction module is configured to receive electronic payment information from the passenger wireless device via the near-field communications receiver.

31. The multimedia distribution system of claim 18, further comprising a security module operatively connected to the passenger device interface and configured to selectively limit outputting of the desired multimedia file by the distribution section in response to digital rights management information associated with the desired multimedia file.

* * * * *